United States Patent [19]

Sekiguchi et al.

[11] 4,105,627
[45] Aug. 8, 1978

[54] MERCAPTOHETEROCYCLIC RESIN STABILIZERS

[75] Inventors: Tetsuo Sekiguchi, Hasuda; Masami Abe, Tokorozawa; Kouji Tsuruga, Ohmiya; Nobuhide Tominaga, Urawa, all of Japan

[73] Assignee: Argus Chemical Corporation, Brooklyn, N.Y.

[21] Appl. No.: 725,356

[22] Filed: Sep. 20, 1976

[51] Int. Cl.² ............... C08K 5/34; C08K 5/37; C08K 5/52; C09K 3/00
[52] U.S. Cl. ............... 260/45.8 N; 252/400 A; 252/402; 252/407; 260/45.7 PH; 260/45.75 R; 260/45.8 A
[58] Field of Search ............ 260/45.8 N, 45.8 NT, 260/45.75 R, 45.8 A, 45.7 PH; 252/402, 400 A

[56] References Cited

U.S. PATENT DOCUMENTS

| | | | |
|---|---|---|---|
| 3,004,949 | 10/1961 | Chevassus | 260/45.8 N |
| 3,366,598 | 1/1968 | Westlinning et al. | 260/42.37 |
| 3,453,225 | 7/1969 | Pollock | 252/400 A |
| 3,458,472 | 7/1969 | Kander | 260/45.8 N |
| 3,467,683 | 9/1969 | Harson et al. | 252/400 A |
| 3,629,170 | 12/1971 | Yamanouchi et al. | 260/45.8 N |
| 3,636,031 | 1/1972 | Drake et al. | 252/402 |
| 3,669,936 | 6/1972 | Regenass et al. | 260/18 N |
| 3,888,822 | 6/1975 | Gilleo et al. | 260/45.8 NT |
| 3,909,491 | 9/1975 | Gilles | 260/45.8 NT |

*Primary Examiner*—H.S. Cockeram
*Attorney, Agent, or Firm*—Otto S. Kauder

[57] ABSTRACT

Improved clarity and resistance to deterioration on heating of polyvinyl fluoride and vinyl chloride polymers is obtained by employing a stabilizer composition consisting essentially of (A) a heterocyclic nitrogen compound having as part of a 5 or 6 membered heterocyclic ring the group

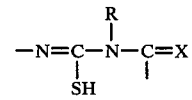

in which R is hydrogen, aryl, or alkyl having 1 to 12 carbon atoms, and X is oxygen or sulfur, and (B) one or more 1,2-epoxides, organic phosphites, or stannous tin, zinc, magnesium, aluminum, potassium, sodium, calcium, strontium, or barium salts of non-nitrogenous monocarboxylic acids having from 6 to 24 carbon atoms or hydrocarbon-substituted phenols having from about 10 to about 30 carbon atoms.

20 Claims, No Drawings

MERCAPTOHETEROCYCLIC RESIN STABILIZERS

BACKGROUND OF THE INVENTION

This invention relates to new stabilizer compositions for polyvinyl fluoride and vinyl chloride polymers, and more particularly to stabilizer combinations that improve the clarity and resistance to deterioration on being heated at processing temperatures of such polymers.

Polyvinyl fluoride has been used for coatings on metal substrates applied from solutions in organic solvent such as dimethylformamide or from dispersions in latent solvents (liquids such as dimethyl phthalate that act as solvents at elevated temperatures only) and subsequently cured at 200° to 375° C. Polyvinyl fluoride has also been processed by mill rolling and compression molding to produce unsupported sheets at 210°–250° C. In the absence of added stabilizers the polymer is badly discolored by these treatments. A variety of materials have been disclosed as having the ability to mitigate the difficulty. These include alkyl-substituted phenols, alkylidenebisalkylphenols, and thiobisalkylphenols in various combinations, for example with a dialkyl pentaerythritol diphosphite in S. Gobstein, U.S. Pat. No. 3,442,853 issued May 6, 1969, with tripentaerythritol and a glycidyl methacrylate polymer in S. Koizumi et al, U.S. Pat. No. 3,755,796 issued Aug. 28, 1973, with potassium carbonate in T. Bunkichi et al, Japanese Specification 14180/73 issued May 4, 1973, or as the only stabilizer, for example in B. Ryutani, Japanese Specifications 4137/72 of Feb. 4, 1972 and 5417 of Feb. 16, 1972, and in B. Tatsuya et al, Japanese Specification 13,937/73 of May 1, 1973. T. Nishida et al have disclosed the use of carbodiimides, for example dicyclohexylcarbodiimide combined with various materials, as organic isocyanates in Japanese Specification No. 13938/73 of May 1, 1973; aliphatic multiolefins in Japanese Specification No. 14177/73 of May, 4, 1973; fatty acid esters in Japanese Specification No. 13, 939/73 of May 1, 1973; nitroaromatic compounds in Japanese Specification 13941/73 of May 1, 1973; aliphatic mercaptans in Japanese Specification No. 13940/73 of May 1, 1973. G. Heuser et al have disclosed stabilizers containing barium and cadmium salts of higher fatty acids, optionally along with phenols and 2-hydroxybenzophenones, in German published application 2.035,259 of January 20, 1972, and a 2-hydroxybenzophenone-dihydric phenol- polyhydric alcohol combination in U.S. Pat. No. 3,779,985 of December 18, 1973. Additional materials disclosed as stabilizers for polyvinyl fluoride include vinylpyridine polymers by L. Scoggins in U.S. Pat. No. 3,627,854 issued Dec. 14, 1971 and zinc dithiophosphinates used with an alkyl acrylate or methacrylate polymer, a polyhydric alcohol, and optionally a thiodipropionic acid diester by Franks et al in U.S. Pat. No. 3,533,981 of Oct. 13, 1970. Thus the literature in this field is confused and contradictory, as Gobstein above cited points out that "hydrogan halide acceptors such as those employed to stabilize polyvinyl chloride are not generally effective in preventing degradation of polyvinyl fluoride resins" and yet many of the chemicals disclosed as stabilizers for polyvinyl fluoride are known to be effective polyvinyl chloride stabilizers.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin caboxylates, as disclosed by Quattlebaum in U.S. Pat. No. 2,307,157; organotin mercaptides as disclosed by Leistner in U.S. Pat. Nos. 2,641,588 and 2,641,596; various metal-free organic compounds such as the polyols, e.g. mannitol, sorbitol, glycerol, pentaerythritol, organic phosphites, 1,2-epoxides, e.g., soybean oil epoxide, isooctyl epoxystearate, and the diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," Rubber Age 85 449–452 (June, 1959), and by H. Verity-Smith, British Plastics 27 176–179, 213–217, 307–311 (1954); the brochure by the same author The Development of the Organotin Stabilizer (Tin Research Institute, 1959) and the book La Stabilisation des Chlorures de Polyvinyle by F. Chevassus (Amphora, Paris, 1957).

M. Arakawa, Japanese Specification 4904/71 of Feb. 6, 1971, discloses heat-stabilized asbestos-polyvinyl chloride compositions containing as a stabilizer a water-insoluble compound having one of the formulas:

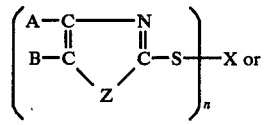

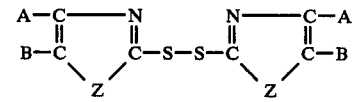

where A and B are both hydrogen or form a benzene nucleus by ring closing with the —C═C— bond in the five member ring, Z stands for sulfur or ═NH group or N-oxyalkylene group having 1-12 carbon atoms, X stands for hydrogen, N-cycloparaffin group having 1-6 carbon atoms, or a two to four valent metal, $n$ stands for an integer of 1 to 4, and if X is other than a metal, $n$ is 1. Specifically disclosed examples of these compounds are 2-mercaptobenzothiazole, 2-mercaptobenzimidazole and 2-mercaptothiazole.

N. Fukuoka et al in Japanese Specification No. 22642/68 of September 30, 1968 disclose the protection of synthetic rubber, polyolefins and polyhaloolefins with compounds having the formula

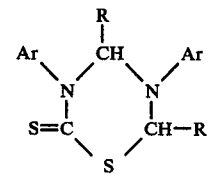

where R is hydrogen, or an alkyl, alkoxymethyl, substituted phenoxymethyl or aralkyl group, and Ar is an aryl group.

SUMMARY OF THE INVENTION

In accordance with this invention, we have found that polyvinyl fluoride and vinyl chloride polymer compositions of excellent initial color and clarity which show substantially no discoloration or cloudiness even after 15 minutes of heating at 350° F, can be produced if there is incorporated in the polymer composition a stabilizer combination consisting essentially of (A) at least one heterocyclic nitrogen compound having as part of a heterocyclic ring of 5 to 6 members the group

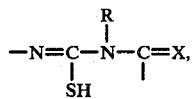

in which R is selected from the group consisting of hydrogen, aryl, and alkyl having from 1 to about 12 carbon atoms, and X is selected from the group consisting of oxygen and sulfur; and (B) at least one compound selected from the group consisting of 1,2-epoxides, organic phosphites, and stannous tin, zinc, magnesium, aluminum, potassium, sodium, calcium, strontium, and barium salts of non-nitrogenous monocarboxylic acids having from 6 to 24 carbon atoms and of hydrocarbon-substituted phenols having from 10 to about 30 carbon atoms. Only very small amounts of the combination are required to achieve this improvement in clarity and resistance to deterioration and amounts of the combination in the range from 0.01 to 5 parts for 100 parts of polymer are usually sufficient. The preferred proportions of the essential constituents (A) and (B) of the combination to each other are in the range of 1 to 1 to 1 to 500 by weight.

The stabilizer combination of this invention consisting essentially of the recited constituents (A) and (B) can also contain additional ingredients compatible with and reinforcing the stabilizing effectiveness of the essential constituents (A) and (B). Cadmium compounds, lead compounds, and organic compounds of four-valent tin having at least one organic group liked to tin through carbon are not contemplated as essential or optional constituents of the stabilizer combination of this invention.

DESCRIPTION OF THE PREFERRED EMBODIMENTS

The heterocyclic nitrogen compound constituent of the stabilizer combination of this invention can be represented by the formula:

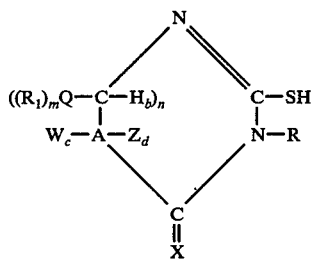

in which A is selected from the group consisting of nitrogen and carbon; Q is selected from the group consisting of a single bond; —O—, =O, —S—, —SS—, —NH—, —NR$_2$ where R$_2$ can be alkyl having 1 to 18 carbon atoms, alkenyl having 3 to 6 carbon atoms, cycloalkyl, aryl, haloaryl, alkylaryl, and hydroxyaryl; —OYO—, —SYS—, and —NHYNH— where Y can be alkylene having 1 to 2 carbon atoms, arylene, and alkylarylene; and, when taken together with W in a heterocyclic ring —NHCH=N— and —C(=X)—N-R—C(SH)=N—; R$_1$ is selected from the group consisting of hydrogen, alkyl having 1 to 18 carbon atoms, alkenyl having 3 to 6 carbon atoms, cycloalkyl, aryl, aralkyl, haloaryl, alkylaryl, alkylhydroxyaryl, N-morpholino and C-alkylmorpholino, N-piperidino and C-alkyl-N-piperidino, and 2,4-dimercapto-1,3,5-triazin-6-yl; W is selected from the group consisting of hydrogen, amino, alkyl having 1 to about 12 carbon atoms, alkenyl having 3 to 6 carbon atoms, and when taken together with Q in a heterocyclic ring, —N=CHNH— and —N=C(SH)—NR—C(=X)—; Z is selected from the group consisting of hydrogen, alkyl having 1 to about 12 carbon atoms, and alkenyl having 3 to 6 carbon atoms; and b,c,d, m, and n are each independently zero or one, provided than when Q and W are taken together in a heterocyclic ring m is zero.

Alkyl groups occurring in the above formula at R, W, Z, R$_1$, and R$_2$ can be for example methyl, ethyl, propyl, isopropyl, butyl, isobutyl, t-butyl, sec-butyl, amyl, isoamyl, 1-methylbutyl, hexyl, isohexyl, heptyl, octyl, t-octyl, 2-ethylhexyl, nonyl, decyl, dodecyl, t-dodecyl, 2-butyloctyl, isotridecyl, myristyl, pentadecyl, palmityl, heptadecyl and stearyl. Alkenyl groups occurring at W, Z, R$_1$ and R$_2$ can be for example allyl, methallyl, 2-buten-1-yl, 3-penten-1-yl, 3-methylbut-en-2-yl and 1-hexen-1-yl. Aryl, alkylaryl, and haloaryl groups occurring at R, R$_1$, and R$_2$ can be for example phenyl, tolyl, xylyl, ethylphenyl, diethylphenyl, t-butylphenyl, isopropylphenyl, naphthyl, chlorophenyl, bromotolyl, and chloronaphthyl. Cycloalkyl groups occurring at R$_1$ and R$_2$ can be for example cyclopentyl, methylcyclopentyl, cyclohexyl, trimethylcyclohexyl, methyl, and isobornyl. Aralkyl groups occurring at R$_1$ can be for example benzyl, ethylbenzyl, alpha-phenethyl, betaphenethyl, and naphthalenemethyl. Hydroxyaryl and alkylhydroxyaryl groups occurring at R$_1$ and R$_2$ can be for example hydroxyphenyl, hydroxyxylyl, 4-hydroxy-3,5-di-t-butylphenyl, and 2-hydroxy-1-naphthyl.

Arylene and alkylarylene groups occurring at Y can be for example phenylene, dimethylphenylene, and dimethylnaphthylene.

Many of the heterocyclic nitrogen compounds of this invention exist in two or more tautomeric forms, that is isomers that interconvert readily so that the compound as usually obtained is in fact a mixture of the tautomeric forms in equilibrium. Tautomeric forms of the characteristic group

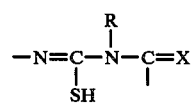

found in the equilibrium mixture of the tautomeric forms include

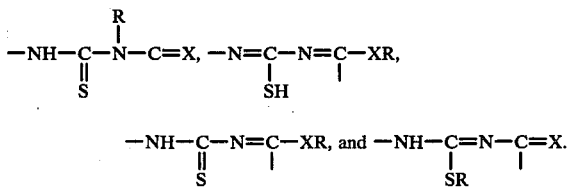

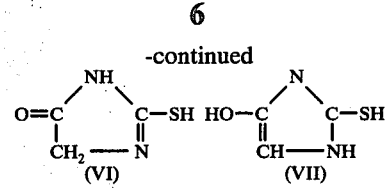

The heterocyclic nitrogen compounds of this invention can be used in the form of their ammonium, barium, calcium, lithium, magnesium, potassium, sodium, strontium, and zinc salts.

When the heterocyclic nitrogen compound (A) has the characteristic group

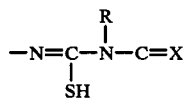

in a five-member ring, $n$ in the above formula is zero. The bond between the ring nitrogen and the atom A is a single bond or a double bond as required to maintain the three-valence of nitrogen and the four-valence of carbon. The five-member ring compound can be a 3-mercapto-1,2,4-triazole when A in the above formula is nitrogen. Exemplary of a 3-mercapto-1,2,4-triazole according to this invention is 3,5-dimercaptotriazole having R hydrogen, X sulfur, and $c$ and $d$ zero represented by formula (I)

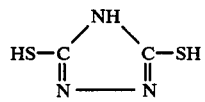

as well as by the tautomeric formulae (II) and (III)

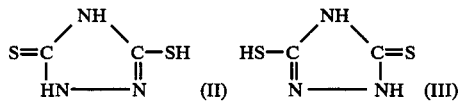

which exist in tautomeric equilibrium, that is spontaneous interconversion, between one another. For a fuller explanation of tautomerism and tautomeric formulae of hetercyclic nitrogen compounds including those used according to this invention reference can be made to B. Whitear et al British Pat. No. 1,049,053 of November 23, 1966. When A in the formula of a five-member heterocyclic compound according to this invention is carbon, the compound can be a thiohydatoin represented for the case of the simplest thiohydantoin namely thiohydantoin itself also named 2-mercapto-5-hydroxyimidazole having W, Z, and R hydrogen, X oxygen, and $c$ and $d$ one, by formula (IV) as well as its tautomers (V), (VI), and (VII)

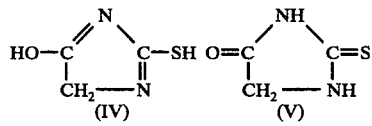

When the heterocyclic nitrogen compound (A) is a six-member ring compound, $n$ in the general formula is one. The bond between the carbon atom carrying the group $Q(R_1)_m$ to the atom A is a single bond or double bond as required to maintain the four-valence of carbon and the three-valence of nitrogen.

When A is the formula of a six-member heterocyclic compound according to this invention is nitrogen, the compound can be a 2-mercapto-1,3,5-triazine represented, for the case of 2,4-dimercapto-6-hydroxy-1,3,5-triazine having R and $R_1$ hydrogen, X sulfur, Q oxy (—O—), and $b,c,$ and $d$ zero, by formula (VIII) as well as the tautomers thereof (IX) and (X).

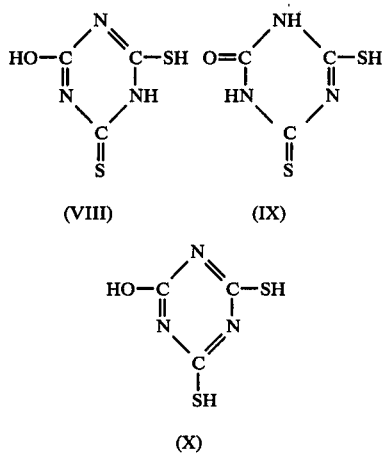

When A in the formula of a six-member heterocyclic nitrogen compound according to this invention is carbon, the compound can be a 2-mercaptopyrimidine represented, for the case of 6-methyl-2-mercapto-4-hydroxypyrimidine having R, $R_1$, and W hydrogen, Q methylene, $c$ and $n$ one, and $b$ and $d$ zero, by formula (XI) as well as the tautomers thereof (XII), (XIII), and (XIV).

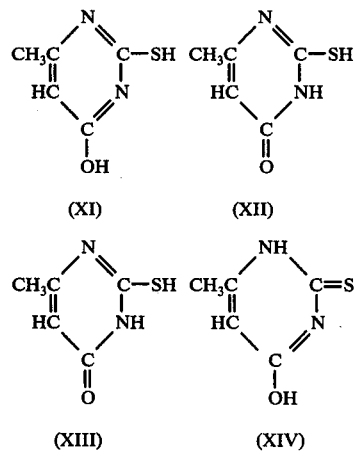

Heterocyclic nitrogen compounds having the group

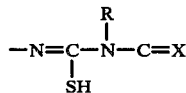

in accordance with this invention include the following, along with their tautomers and ammonium, barium, calcium, lithium, magnesium, potassium, sodium, strontium, and zinc salts.

Five-member heterocyclic ring compounds:
   3,5-Dimercapto-1,2,4-triazole
   2-Thiohydantoin Six-membered two-nitrogen ring (pyrimidine) compounds:
   2-mercapto-4-hydroxypyrimidine
   2-mercapto-4-hydroxy-6-methylpyrimidine
   2-mercapto-4,6-dihydroxypyrimidine
   2-mercapto-4,5-diamino-6-hydroxy pyrimidine
   2-mercapto-4-hydroxy-6-propylpyrimidine
   5-ethyl-5-(1'-methylbutyl)-2-thiobarbituric acid
   5-allyl-5-(1'-methylbutyl)-2-thiobarbituric acid
   2-mercapto-6-hydroxypurine
   2,6-dimercapto-4,8-dihydroxypyrimid(5-4-a) pyrimidine
   3-phenyl-6-methyl-2-thiouracil
   2,4-dimercapto-6-methyl-pyrimidine
   2-mercapto-4-hydroxy-5,6-dihydropyrimidine Six-membered three-nitrogen ring (triazine) compounds:
   2-(N-N-dibutylamino)-4,6-dimercapto-1,3,5-triazine
   2-anilino-4,6-dimercapto-1,3,5-triazine
   2,4,6-trimercapto-1,3,5-triazine
   2,4-dimercapto-6-amino-1,3,5-triazine
   2-(N,N-diphenylamino)-4,6-dimercapto-1,3,5-triazine
   2-(N,N-diallylamino)-4,6-dimercapto-1,3,5-triazine
   2-benzylamino-4,6-dimercapto-1,3,5-triazine
   2-(4'-hydroxy-3',5'-di-t-butylphenylamino)-4,6-dimercapto-1,3,5-triazine
   2-morpholino-4,6-dimercapto-1,3,5-triazine
   2-hydroxy-4,6-dimercapto-1,3,5-triazine
   2-methoxy-4,6-dimercapto-1,3,5-triazine
   2-phenoxy-4,6-dimercapto-1,3,5-triazine
   2-(2',4'-dimethylphenoxy)-4,6-dimercapto-1,3,5-triazine
   2-(3'-chlorophenoxy)-4,6-dimercapto-1,3,5-triazine
   2-naphthyloxy-4,6-dimercapto-1,3,5-triazine
   2-butylmercapto-4,6-dimercapto-1,3,5-triazine
   2-laurylmercaptoethylenemercapto-4,6-dimercapto-1,3,5-triazine
   2-(4'-hydroxy-3',5'-di-t-butylphenylmercapto)-4,6-dimercapto-1,3,5-triazine
   2-benzylmercapto-4,6-dimercapto-1,3,5-triazine
   2,4-di(N-phenylamino)-6-mercapto-1,3,5-triazine
   2,4-bis(N,N-diethylamino)-6-mercapto-1,3,5-triazine
   2,4-diamino-6-mercapto-1,3,5-triazine
   2,4-dilaurylmercapto-6-mercapto-1,3,5-triazine
   2,4-diphenylmercapto-6-mercapto-1,3,5-triazine
   2-octadecylmercapto-4-hydroxy-6-mercapto-1,3,5-triazine
   2,2'-dithiobis(4,6-dimercapto-1,3,5-triazine)
   2,2'-dithiobis(4-dibutylamino-6-mercapto-1,3,5-triazine)
   2,2'-dithiobis(4-phenylamino-6-mercapto-1,3,5-triazine
   2,2'-dithiobis(4-butylmercapto-6-mercapto-1,3,5-triazine)
   2,2'-N,N'-ethylenediaminobis(4,6-dimercapto-1,3,5-triazine)
   2,2'-phenylene dioxybis(4,6-dimercapto-1,3,5-triazine)
   2,2'-methylenedithiobis(4,6-dimercapto-1,3,5-triazine)
   2-N-n-laurylamino-4,6-dimercapto-1,3,5-triazine
   2-(4'-ethoxycarbonylphenyl)amino-4,6-dimercapto-1,3,5-triazine
   2-methylamino-4,6-dimercapto-1,3,5-triazine
   2-(N,N-dimethylamino)-4,6-dimercapto-1,3,5-triazine
   2-(N,N-diethylamino)-4,6-dimercapto-1,3,5-triazine
   2-n-butylamino-4,6-dimercapto-1,3,5-triazine
   2-(N,N-di-sec-butylamino)-4,6-dimercapto-1,3,5-triazine
   2-n-octylamino-4,6-dimercapto-1,3,5-triazine
   2-t-octylamino-4,6-dimercapto-1,3,5-triazine
   2-(N,N-octadecylamino)-4,6-dimercapto-1,3,5-triazine
   2-cyclohexylamino-4,6-dimercapto-1,3,5-triazine
   2-(N,N-dicyclohexylamino)-4,6-dimercapto-1,3,5-triazine
   2-(N,N-dibenzylamino)-4,6-dimercapto-1,3,5-triazine
   2-(2'-methylpiperidyl)-4,6-dimercapto-1,3,5-triazine
   2-(4'-methylphenylamino)-4,6-dimercapto-1,3,5-triazine
   2-(3'-hydroxyphenylamino)-4,6-dimercapto-1,3,5-triazine
   2-(4'-chlorophenylamino)-4,6-dimercapto-1,3,5-triazine
   2-naphthylamino-4,6-dimercapto-1,3,5-triazine These compounds and others having the characteristic group

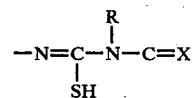

according to this invention are known compounds, or homologs of known compounds, that can be prepared by known methods. Useful preparative techniques applicable to many such compounds can be found in the disclosures of H. Westlinning et al U.S. Pat. No. 3,366,598 of Jan. 30, 1968; F. Regenass U.S. Pat. No. 3,669,936 of June 13, 1972; and K. Gilleo U.S. Pat. No. 3,888,822 of June 10, 1975.

A 1,2-epoxide compound (B) constituent of the stabilizer composition of this invention is characterized chemically by the presence of at least one epoxy group

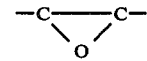

in the molecule and physically by a sufficiently low volatility to avoid being volatilized from the stabilized polymer composition during processing or use. The 1,2-epoxide compound has usually at least 18 carbon atoms in the molecule.

Particularly useful 1,2-epoxides are the epoxy higher esters having from 18 to 150 carbon atoms. Such esters will initially have had unsaturation in the alcohol or acid portions of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include methanol, butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cotton-seed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

Additional 1,2-epoxides that can be used include epoxidized polybutadiene, epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxypropoxy) benzene, 4,4'-bis(2,3-epoxypropoxy) diphenyl ether, 1,2-bis(2,3-epoxypropoxy) cyclohexane, and 1,3-bis(4,5-epoxy pentoxy)-5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxyphenyl) butane, 4,4'-dihydroxybenzophenone and 1,5-dihydroxy naphthalene with halogen-containing epoxides such as 3-chloro-1,2-epoxybutane, 3-chloro-1,2-epoxyoctane, and epichlorohydrin.

An organic phosphite constituent (B) of the stabilizer composition of this invention can be any organic phosphite having one or more organic radicals attached to phosphorus through oxygen. These radicals can be monovalent radicals in the case of the triphosphites, diphosphites and monophosphites, which can be defined by the formula:

$$R_1-O-P-O-R_3$$
$$|$$
$$O$$
$$|$$
$$R_2$$

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

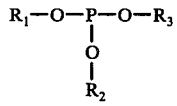

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositions of the invention are mixed heterocyclic-open chain phosphites of the type:

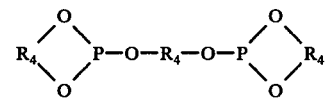

More complex phosphites are formed from trivalent organic radicals, of the type:

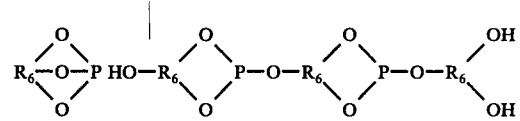

in which $R_6$ is a trivalent organic radical of any of the types of $R_1$ to $R_5$, inclusive, as defined above.

A particularly useful class of complex phosphite are the tetraoxadiphosphaspiro undecanes of the formula

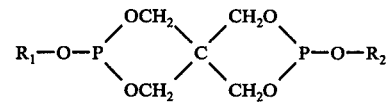

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl.

An especially preferred class of organic phosphites have a bicyclic aromatic group attached to phosphorus through oxygen, with no or one or more phenolic hydroxyl groups on either or both of the aromatic rings. These phosphites are characterized by the formula:

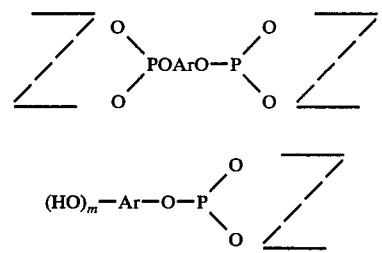

in which Ar is a mono or bicyclic aromatic nucleus and m is an integer of from 0 to about 5. Z is one or a plurality of organic radicals as defined above for $R_1$ to $R_6$, taken singly or together in sufficient number to satisfy the valences of the two phosphite oxygen atoms. Z can also be hydrogen, and can include additional bicyclic aromatic groups of the type (HO)$_m$-Ar.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, di-isooctyl monotolyl phosphite, tri-2-ethylhexyl phosphite, phenyl dicylohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-a-naphthyl phosphite, tri(phenylphenyl) phosphite, tri(2-phenyl ethyl) phosphite, monododecyl phosphite, di(p-tert-butyl phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyl-dioxaphosphorinane, 2-cyclohexyloxy-5,5-diethyl dioxaphosphorinane, monophenyl phosphite, 2-ethylhexyl phosphite, isooctyl phosphite, cresyl phosphite, t-octylphenyl phosphite, t-butyl phosphite, diphenyl phosphite, diisooctyl phosphite, dicresyl phosphite, dioctylphenyl phosphite, didodecyl phosphite, di-a-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary pentaerythrityl phosphites are 3,9-diphenoxy-2,4,8,10-tetraoxa-3,9-diphosphaspiro-(5,5)-undecane (diphenyl-pentaerythitol-diphosphite), 3,9-di(decyloxy)-2,4,8,10-tetraoxa-3,9-diphosphaspiro-(5,5)-undecane, 3,9-di(isodecyloxy)-2,4,8,10-tetraoxa-3,9-diphosphaspiro-(5,5)-undecane, 3,9-di(octadecyloxy)2,4,8,10-tetraoxa-3,9-diphosphaspiro-(5,5)-undecane,3-phenoxy-9-isodecyloxy-2,4-8,10-tetraoxa-3,9-diphosphaspiro-(5,5)-undecane, 3,9-di(methoxy)2,4,8,10-tetraoxa-3,9-diphosphaspiro-(5,5)-undecane 3,9-di(lauryloxy)-2,4,8,10-tetraoxa-3,9,diphosphaspiro-(5,5)-undecane, 3,9-di-p-tolyoxy-2,4,8,10-tetraoxa-3,9-diphosphaspiro-(5,5)-undecane; 3,9-di(methoxyethoxy)2,4,8,10-tetraoxa,3,9,diphosphaspiro. -(5,5)-undecane; 3-methoxyethyloxy-9-isodecyloxy-2,4,8,10-tetraoxa-3,9-diphosphaspiro-(5,5)-undecane; 3,9-di(ethoxyethoxy)-2,4,8,10-tetraoxa-3,9-diphosphaspiro-(5,5)-undecane; 3,9-di(butoxyethoxy)-2,4,8,10-tetraoxa-3,9-diphosphaspiro-(5,5)-undecane; 3-methoxyethoxy-9-butoxyethoxy-2,4,8,10-tetraoxa-3,9-diphosphaspiro-(5,5)-undecane; 3,9-di(methoxyethoxyethoxy)2,4,8,10-tetraoxa-3,9-diphosphaspiro-(5,5)-undecane; 3,9-di(butoxyethoxyethoxy-2,4,8,10-tetraoxa-3,9-diphosphaspiro-(5,5)-undecane; 3,9-di(methoxyethoxyethoxyethoxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro-(5,5)-undecane (where the (polyethoxy)ethoxy group has an average molecular weight of 350) 3,9-di(methoxy(polyethoxy)ethoxy)-2,4,8,10-tetraoxa-3,9-diphosphaspiro-(5,5)-undecane (where the (polyethoxy)-ethoxy group has an average molecular weight of 550).

Exemplary of the bis aryl phosphites are: bis(4'-thio-bis(2-tertiary-butyl-5-methyl-phenol)) isooctyl phosphite, mono(4,4'-thio-bis(2-tertiary-butyl-5-methyl-phenol)) di-phenyl phosphite, tri-(4,4'-n-butlidene-bis(2-tertiary-butyl-5-methyl-phenol)) phosphite, (4,4'-benzylidene-bis(2-tertiary-butyl-5-methyl-phenol)) di-phenyl phosphite, isooctyl 2,2'-bis(parahydroxyphenyl) propane phosphite, tridecyl 4,4'-n-butylidene-bis(-2-tertiary-butyl-5-methyl-phenol) phosphite, 4,4'-thiobis(2-tertiary-butyl-5-methylphenol) phosphite, 2-ethylhexyl-2,2'-methylene-bis(4-methyl-6-1'-methylcyclohexyl) phenol phosphite, tri(2,2'-bis-(para-hydroxyphenyl) propane) phosphite, tri(4,4'-thio-bis(2-tertiary-butyl-5-methyl-phenol) phosphite, isooctyl-(2,6-bis(2'-hydroxy-3,5-dinonylbenzyl)-4-nonyl phenyl)) phosphite, tetratridecyl 4,4'-n-butylidene-bis(2-tertiary-butyl-5-methyl phenyl) diphosphite, tetra-isooctyl 4,4'-thiobis(2-tertiary-butyl-5-methyl phenyl) diphosphite, 2,2'-methylene-bis(4-methyl-6-1'-methyl cyclohexyl phenyl) polyphosphite, isooctyl-4,4'-isopropylidene-bis-phenyl-polyphosphite, 2-ethylhexyl-2,2'-methylene-bis(4-methyl-6,1'-methyl-cyclohexyl) phenyl triphosphite, tetratridecyl-4,4'-oxydiphenyl diphosphite, tetra-n-dodecyl-4,4'-n-butylidenebis(2-tertiary-butyl-5-methylphenyl) diphosphite, tetra-tridecyl-4,4'-iso-propylidene bisphenyl diphosphite, hexatridecyl butane-1,1,3-tris(2'-methyl-5'-tertiary-butylphenyl-4'-) triphosphite.

A metal salt constituent (B) of the stabilizer composition of this invention is a salt of stannous tin, zinc, magnesium, aluminum, potassium, sodium, calcium, strontium, or barium with a carboxylic acid having from 6 to 24 carbon atoms or a hydrocarbon-substituted phenol having from about 10 to about 30 carbon atoms.

The acid can be any organic non-nitrogenous monocarboxylic acid having from six to 24 carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, neodecanoic acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenylacetic acid, butylbenzoic acid, ethylbenzoic acid, propylbenzoic acid, hexylbenzoic acid, salicylic acid, naphthoic acid, 1-naphthalene-acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, isoamyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The metal phenolate should be compatible with the halogen-containing resin.

Mixtures of salts of various metals can be used, and many such mixtures are known to give enhanced effects, such as mixed zinc and tin salts with the alkali metal or alkaline earth metal salts, e.g., potassium and zinc stearates, as in U.S. Pat. No. 2,446,976.

Usually, only a relatively small proportion of the new stabilizer combination gives a noticeable improvement in clarity. The usual amounts employed, based on total weight of resin, are within the range from about 0.005 to 5%, preferably 0.05 to 2%. Larger amounts, while generally not detrimental to the quality of the product, will be wasteful.

The stabilizer composition of this invention is applicable to any polyvinyl fluoride and vinyl chloride polymer. The term "vinyl chloride polymer" as used herein is inclusive of any polymer formed at least in part of the recurring group,

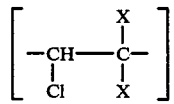

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor porportion, such as copolymers of vinyl chloride and vinyl acetate, copolymers of vinyl chloride with maleic or fumaric acids or esters, and copolymers of vinyl chloride with styrene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows: "a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The stabilizer combinations of this invention are effective in improving clarity of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

Preferred classes of additional stabilizers that can be used include the phenols, aliphatic polyhydroxy compounds; esters, amides, and hydrazides of thioalkylenedicarboxylic acids and nitrilotrialkylenetricarboxylic acids; ketoacetic acid compounds; and organic nitrogen compounds such as the esters of beta-aminocrotonic acid, diphenylthiourea, and 2-phenylindole. Phenol stabilizers can be included with the stabilizer composition of this invention in amounts corresponding to 0.01 to about 0.2 parts per 100 parts of polymer being stabilized. Typical phenol stabilizers are butylated hydroxy-toluene (BHT), 4,4'-isopropylidenebisphenol, and 1,1,3-tris(2'-methyl-4'-hydroxy-5'-t-butylphenyl)butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tri-pentaerythritol, mannitol, sorbitol, and partial esters of these with saturated and unsaturated fatty acids having 6 to 22 carbon atoms.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris(ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris(acetoacetate) and dehydroacetic acid. A comprehensive disclosure of ketoacetic acid compounds that can be used from column 2 line 32 to column 5 line 19 of U.S. Pat. No. 3,346,536 issued Oct. 10, 1967 here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2′-thiodiethyl-3-aminocrotonate; thiocarbanilide and 2-phenylindole, 1,3-dibutylthiourea, phenylurea, and p-ethoxyphenylurea.

Stabilizer compositions in accordance with this invention can be in solid, liquid, or paste form. Liquid compositions can be prepared by blending the ingredients and heating at 40° to 200° C for up to 6 hours to achieve visual homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monoaryl ethers, and water; anticaking agents such as talc, magnesium trisilicate, sodium silicoaluminate, and aluminum calcium silicate. The following are non-limiting examples of liquid stabilizer compositions that can be prepared in accordance with this invention:

| No. | Ingredients | Grams | Heated at ° C | Hours |
|---|---|---|---|---|
| I | Diphenyl isooctylphosphite | 40 | 80° | 1 |
| | Barium nonylphenate | 15 | | |
| | Zinc 2-ethylhexoate | 10 | | |
| | 2-ethylhexanol | 5 | | |
| | Aromatic naphtha b.p. 160 – 190° C | 27 | | |
| | 2-(N,N-dibutylamino)-4,6-dimercapto-1,3,5,-triazine | 3 | | |
| II | Epoxysoybean oil | 70 | 80° | 1 |
| | Tris(nonylphenyl phosphite) | 25 | | |
| | 3-phenyl-6-methyl-2-thiouracil | 5 | | |
| III | Diphenyl isodecyl phosphite | 50 | 80° | 1 |
| | Calcium 2-ethylhexoate | 25 | | |
| | Stannous neodecanoate | 20 | | |
| | 2-(N,N-dibutylamino)-4,6-dimercapto-1,3,5-triazine | 5 | | |

The following are non-limiting examples of solid stabilizer compositions that can be prepared in accordance with this invention:

| No. | Ingredients | Grams |
|---|---|---|
| IV | Barium stearate | 57 |
| | Zinc laurate | 40 |
| | 2-Mercapto-4,6-dihydroxypyrimidine | 3 |
| V | Calcium stearate | 44 |
| | Zinc stearate | 44 |
| | Bisphenol A | 2 |
| V | 2-Anilino-4,6-dimercapto-1,3,5-triazine | 10 |
| VI | Zinc benzoate | 21 |
| | Strontium stearate | 72 |
| | Potassium 5,5-diethyl-2-thiobarbiturate | 7 |

The following are non-limiting examples of paste stabilizers compositions that can be prepared in accordance with this invention:

| No. | Ingredients | Grams |
|---|---|---|
| VII | Epoxylinseed oil | 65 |
| | Zinc palmitate | 15 |
| | Magnesium palmitate | 8 |
| | 2-Mercapto-4-hydroxy-6-methylpyrimidine | 12 |
| VIII | Epoxysoybean oil | 70 |
| | BHT antioxidant | 5 |
| | Aluminum stearate | 10 |
| | 2-hydroxy-4,6-dimercapto-1,3,5-triazine | 15 |

The preparation of the stabilized polymer composition is easily accomplished by conventional procedures. The selected stabilizer combination along with such compounding ingredients as plasticizers, colors, lubricants, antistatic agents etc. as may be needed, is blended with the polymer being stabilized, using, for instance, plastic mixing rollers, at a temperature at which the mix is fluid and thorough blending facilitated, typically at from 250° to 350° F. for a time sufficient to form a homogeneous sheet, five minutes, usually. After the mass is formed, it is sheeted off in the usual way.

The following examples in the opinion of the inventors represent preferred embodiments of their invention.

EXAMPLES 1 – 9

In order to examine the stabilizing effect of the composition of the present invention on polyvinyl fluoride resin, sheets were prepared by mixing on a two roll mill at 210° C for 3 minutes in accordance with the following formulation and then clipped between polished chrome-plated steel sheets and compressed at 250° C for 5 minutes at 100kg/cm$^2$.

The condition of sheets were shown in Table - 1

| (Formulation) | |
|---|---|
| Polyvinyl fluoride resin | 100 parts |
| Sample (Table-1) | 0.1 |
| Tris(nonylphenyl phosphite) | 0.3 |

Table 1

| No. | Sample | Condition of Sheet |
|---|---|---|
| Control A | None | Carbonized and brittle |
| Example 1 | 2-mercapto-4-hydroxy-6-methylpyrimidine | Colorless |
| Example 2 | 2-mercapto-4,6-dihydroxy-pyrimidine | Colorless |
| Example 3 | 2(N,N-dibutylamino)-4,6-dimercapto-1,3,5-triazine | Nearly Colorless |
| Example 4 | 3-phenyl-6-methylthiouracil | Colorless |
| Example 5 | 2,4-dimercapto-6-methyl-pyrimidine | Colorless |
| Example 6 | Barium 4,6-dihydroxy-pyrimidine-2-mercaptide | Colorless |
| Example 7 | Potassium 4,5-diamino-6-hydroxy-pyrimidine-2-mercaptide | Nearly Colorless |
| Example 8 | Sodium 5-allyl-5-(1-methylbutyl)-2-thiobarbiturate | Nearly Colorless |
| Example 9 | 2,6-dimercapto-4,8-dihydroxy-pyrimidine-(5,4a) pyrimidine calcium salt | Colorless |

The results show that the stabilizer combination of the invention was effective in minimizing discoloration of polyvinyl fluoride while the organic phosphite without any heterocyclic nitrogen compound was unsatisfactory.

EXAMPLES 10 – 17

In order to examine good stabilizing effect of the composition of the present invention in a vinyl chloride polymer samples were prepared by calendering and compression molding in accordance with the following formulation, heated at 175° C, and heat stability, clarity, initial color were determined.

The heat stability results shown in Table-2 are the times of exposure in an air circulating oven required to produce a red, brown, or black discoloration.

Initial color recorded in Table-2 represents the yellowness determined with the Hunter Colorimeter as follows:

$$\text{Yellowness} = \frac{\text{Amber - Blue}}{\text{Green}}$$

| | |
|---|---|
| <6 | extremely superior |
| 6 – 12 | superior - a little superior |
| 12 – 5 | medium |
| 15 – 20 | a little inferior |
| >20 | inferior |

Clarity was rated by visual comparison with a calendered molded sheet of the following composition rated as medium:

| | |
|---|---|
| Vinyl chloride homopolymer | 100 parts by weight |
| Dioctyl phthalate | 50 |
| Barium stearate | 1.2 |
| Zinc laurate | 0.8 |

(Formulation)

| | |
|---|---|
| Vinyl Chloride Homopolymer | 100 parts |
| Dioctyl phthalate | 50 |
| Epoxidized Soybean Oil | 2 |
| Tris nonyl phenyl phosphite | 0.5 |
| Stearic acid | 0.5 |
| Sample | 0.05 |

Table 2

| No. | Sample | Heat stability | Clarity | Initial Color |
|---|---|---|---|---|
| Control B | None | 30 min. | a little inferior | 35 |
| Example 10 | 3,5-Dimercapto-1,2,4-triazole | 60 | A little superior | 16 |
| Example 11 | 2-mercapto-4-hydroxy-6-methylpyrimidine | 90 | Superior | 10 |
| Example 12 | 2-Mercapto-4,6-dihydroxypyrimidine | 90 | Superior | 7 |
| Example 13 | 2,4,6-trimercapto-1,3,5-triazine | 75 | A little Superior | 8 |
| Example 14 | 2,6,-Dimercapto-4,8-dihydroxypyrimide-(5,4-a) pyrimidine | 90 | Superior | 7 |
| Example 15 | Calcium 4-hydroxy-pyrimidine-2-mercaptide | 75 | Superior | 10 |
| Example 16 | 2-Anilino-4,6-dimercaptotriazine-magnesium salt | 90 | Superior | 9 |
| Example 17 | 2,4-dimercapto-6-methylpyrimidine barium salt | 75 | Superior | 8 |

The results indicate the distinct advantages of the stabilizer compositions according to the invention in heat stability, clarity, and initial color.

EXAMPLES 18 – 25

In order to examine the effect of the heterocyclic nitrogen compounds of the present invention in a Ba-Zn stabilizer composition, the same tests as Examples 10–17 were carried out in accordance with the following formulation.

The results are shown in Table-3.

(Formulation)

| | |
|---|---|
| Vinyl chloride homopolymer | 100 parts by weight |
| Dioctyl phthalate | 50 parts by weight |
| Ba-stearate | 1.2 |
| Zn-laurate | 0.8 |
| Sample | 0.05 |

Table 3

| No. | Sample | Heat Stab. | Initial Color | Clarity |
|---|---|---|---|---|
| Control | | | | |
| C | None | 45 min. | 37 | Medium |
| D | Diphenylthiourea | 75 | 25 | a little superior |
| E | 2-mercaptobenzimidazole | 60 | 21 | a little superior |
| Examples | | | | |
| 18 | 2-mercapto-4-hydroxy-Pyrimidine | 105 | 13 | Superior |
| 19 | 2-mercapto-4,5-diamino-6-hydroxypyrimidine | 120 | 11 | Superior |
| 20 | 5-Allyl-5-(1'methyl-butyl)-2-thiobarbituric acid | 105 | 12 | Superior |
| 21 | 3-Phenyl-6-methyl-2-thiouracil | 120 | 8 | Superior |
| 22 | 2-Thiohydantoin | 90 | 15 | A little Superior |
| 23 | Zinc-4-hydroxy-6-methylpyrimidine 2-mercaptide | 120 | 10 | Superior |
| 24 | Barium 6-hydroxy-burine-2-mercaptide | 105 | 10 | Superior |
| 25 | 3-phenyl-6-methyl-2-thiouracil zinc salt | 105 | 9 | Superior |

Control D contains an open chain nitrogen compound and control E a heterocyclic nitrogen compound lacking the characteristic group of the heterocyclic nitrogen compounds according to this invention.

The results show that the compositions stabilized in accordance with this invention are clearly superior in heat stability and initial color and equivalent or superior in clarity compared to the controls.

EXAMPLES 26–33

In order to examine the effect of the compound of the present invention on Ca-Zn system composition, the same tests as Examples 10–17 were carried out in accordance with the following formulation.

The results are shown in Table-4.

(Formulation)

| | |
|---|---|
| Vinyl chloride homopolymer | 100 parts by weight |
| Dioctyl phthalate | 45 |
| Epoxidized soybean oil | 5 |
| Ca-stearate | 1.0 |
| Zn-stearate | 1.0 |
| Sample | 0.03 |

Table 4

| No. | Sample | Heat Stab. | Initial Color | Clarity |
|---|---|---|---|---|
| Control | | | | |
| F | None | 60 min. | 31 | Medium |
| G | Phenothiazine | 75 | 24 | Medium |
| Examples | | | | |
| 26 | 2-Mercapto-4-hydroxy-6-propylpyrimidine | 120 | 8 | Superior |
| 27 | 5-Ethyl-5-(1'methyl-butyl)-2-thiobarbituric acid | 105 | 12 | Superior |
| 28 | 2-Anilino-4,6-dimercapto-1,3,5-triazine | 120 | 8 | Superior |

Table 4-continued

| No. | Sample | Heat Stab. | Initial Color | Clarity |
|---|---|---|---|---|
| 29 | 2-Mercapto-4-hydroxy-5,6-dihydropyrimidine | 120 | 11 | Superior |
| 30 | Calcium 5-ethyl-5-(1'-methylbutyl)2-barbiturate | 105 | 11 | Superior |
| 31 | 2,4,6-Trimercapto-1,3,5-triazine zinc salt | 120 | 10 | A little superior |
| 32 | 2,6-Dimercapto-4,8-dihydroxypyrimid(5,4-a)pyrimidine Ca salt | 120 | 10 | Superior |
| 33 | Calcium 4-hydroxy-5,6-hydropyrimidine-2-mercaptide | 105 | 9 | Superior |

Control G contains a heterocyclic nitrogen compound lacking the characteristic group of compounds according to this invention. The results show that the compositions stabilized in accordance with this invention are clearly superior in heat stability, initial color, and clarity.

EXAMPLES 34–41

In order to examine the effect of the heterocyclic nitrogen compound of this invention on the stabilization of polyvinyl chloride-ABS resin blends, samples were prepared in accordance with the following formulation in the same precedure as Examples 10–17, and heat stability, initial color and clarity were determined.

The results are shown in Table 5.

| (Formulation) | |
|---|---|
| Polyvinyl chloride resin | 80 parts by weight |
| ABS resin | 20 |
| dioctylphthalate | 30 |
| Ba-nonylphenate | 0.7 |
| Zn-octoate | 0.7 |
| Sample | 0.05 |

Table 5

| No. | Sample | Heat Stab. | Initial Color | Clarity |
|---|---|---|---|---|
| Control | | | | |
| H | None | 60 min. | 34 | A little inferior |
| J | Thio di ethanol bis (aminocrotonate) | 75 | 25 | A little Superior |
| Examples | | | | |
| 34 | 2-Mercapto-4,6-dihydroxy-pyrimidine | 120 | 9 | Superior |
| 35 | 2-(N,N-Dibutyl-amino)-4,6-dimercapto-1,3,5-triazine | 105 | 11 | Superior |
| 36 | 2-Mercapto-6-hydroxypurine | 105 | 10 | A little superior |
| 37 | 2,4-Dimercapto-6-methyl-pyrimidine | 120 | 11 | Superior |
| 38 | Barium 4,6-dihydroxy-pyrimidine-2-mercaptide | 120 | 8 | Superior |
| 39 | Sodium 4-hydroxy-6-propyl-pyrimidine 2-mercaptide | 105 | 12 | Superior |
| 40 | 2-(N,N-Dibutyl-amino)-4,6-dimercapto-1,3,5-triazine Sr salt | 120 | 13 | Superior |
| 41 | 3-Phenyl-6-methyl-2-thio-uracil zinc salt | 120 | 9 | Superior |

Control J contains an open chain nitrogen compound instead of a heterocyclic nitrogen compound according to this invention. The results show that the compositions stabilized in accordance with the invention are clearly superior in heat stability and initial color and equivalent or superior in clarity compared to the controls.

EXAMPLES 42–56

In order to examine the combination effect of the stabilizer compositions of the present invention with other additives, the same tests as Example-1 were carried out in accordance with the following formulation, with the modification that the oven test temperature was 190° instead of 175° C.

The results are shown in Table 6

| (Formulation) | |
|---|---|
| Polyvinyl chloride resin | 100 parts by weight |
| Di-2-ethylhexylphthalate | 50 |
| Ca-Stearate | 0.7 |
| Mg-Stearate | 0.7 |
| Zn-Stearate | 0.7 |
| 2-Mercapto-4,6-dihydroxy-pyrimidine | 0.05 |
| Other additive (Table 6) | 0.3 |

Table 6

| No. | Other Additives | Heat Stab. (190° C) | Clarity | Initial Color |
|---|---|---|---|---|
| 42 | None | 90 min. | 14 | Superior |
| 43 | DLTDP(dilaurylthiodipropionate) | 105 | 11 | Very Superior |
| 44 | BHT (butylatedhydroxytoluene) | 120 | 10 | Very Superior |
| 45 | Pentaerythritol | 105 | 7 | " |
| 46 | Tris nonylphenyl phosphite | 120 | 9 | " |
| 47 | Epoxidized soybean oil | 120 | 8 | " |
| 48 | 2-phenylindole | 105 | 9 | " |
| 49 | diphenylthiourea | 105 | 8 | Superior |
| 50 | 1,4-butanediolbis (aminocrotonate) | 120 | 9 | Very Superior |
| 51 | Thiodipropionylhydrazine | 120 | 10 | Very Superior |
| 52 | Nitrilotri acetic acid tributyl amide | 120 | 8 | " |
| 53 | Dehydroacetic acid | 120 | 10 | " |
| 54 | Tetra(12-15C alkyl) Bis-phenol-A-diphosphite | 120 | 8 | Superior |
| 55 | Epoxydized polybutadiene | 120 | 7 | Superior |
| 56 | Octyldiphenylphosphite | 105 | 10 | Very Superior |

The results demonstrate the further advantages associated with the incorporation of additional additives with the stabilizer composition of the invention as shown.

We claim:

1. A stabilizer composition capable of improving the initial clarity and resistance to deterioration when heated at 350° F of halogen-containing resins of the class consisting of polyvinyl fluoride and vinyl chloride polymers, consisting essentially of (A) at least one heterocyclic nitrogen compound having as part of a heterocyclic ring of 5 to 6 members having 2 to 3 nitrogen atoms when five-membered and 3 nitrogen atoms when six-membered the group

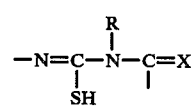

in which R is selected from the group consisting of hydrogen, aryl, and alkyl having from 1 to about 12 carbon atoms, and X is selected from the group consisting of oxygen and sulfur; and (B) for each part by weight of (A) from 1 to 500 parts by weight of at least one compound selected from the group consisting of 1,2-epoxides having 18 to about 150 carbon atoms, organic phosphites having at least one organic radical attached to phosphorus through oxygen, and stannous tin, zinc, and aluminum salts of non-nitrogenous monocarboxylic acids having from 6 to 24 carbon atoms.

2. A stabilizer composition in accordance with claim 1 in which compound (A) has the group

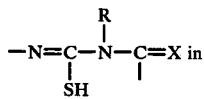

a five membered heterocyclic ring.

3. A stabilizer composition in accordance with claim 2 in which the five membered ring heterocyclic compound has two ring nitrogen atoms.

4. A stabilizer composition in accordance with claim 2 in which the five membered ring heterocyclic compound has three ring nitrogen atoms.

5. A stabilizer composition in accordance with claim 1 in which compound (A) is a 2-mercapto-1,3,5-triazine.

6. A stabilizer composition in accordance with claim 5 in which compound (A) is 2,4-dimercapto-6-anilino-1,3,5-triazine.

7. A stabilizer composition in accordance with claim 1 containing as a compound (B) a 1,2-epoxide having 18 to about 150 carbon atoms.

8. A stabilizer composition in accordance with claim 7 in which the 1,2-epoxide is an epoxidized triglyceride.

9. A stabilizer composition in accordance with claim 7 in which the 1,2-epoxide is an epoxidized polybutadiene.

10. A stabilizer composition in accordance with claim 1 containing as a compound (B) an organic phosphite having at least one organic group attached to phosphorus through oxygen.

11. A stabilizer composition in accordance with claim 10 in which the organic phosphite is an aromatic phosphite.

12. A stabilizer composition in accordance with claim 10 in which the organic phosphite is an aromatic-aliphatic phosphite.

13. A stabilizer composition in accordance with claim 1 containing as a compound (B) a stannous tin or zinc salt of a non-nitrogenous monocarboxylic acid having from 6 to 24 carbon atoms.

14. A stabilizer composition in accordance with claim 13 containing as an additional ingredient at least one salt selected from the group consisting of magnesium, calcium, strontium, and barium salts of non-nitrogenous monocarboxylic acids having from 6 to 24 carbon atoms and barium salts of hydrocarbon-substituted phenols having from 10 to about 30 carbon atoms, the weight proportions of the salt of claim 13 to the additional ingredient ranging from 15:8 to 21:72.

15. A stabilizer composition in accordance with claim 1 containing as an additional ingredient a compound selected from the group consisting of hindered phenols; aliphatic polyhydroxy compounds; esters, amides, and hydrazides of thiodialkylenedicarboxylic and nitrilotrialkylenetricarboxylic acids; keto-acetic acid compounds; diphenyl thiourea, and 2-phenylindole.

16. A stabilizer composition in accordance with claim 1 in which compound (A) has the formula

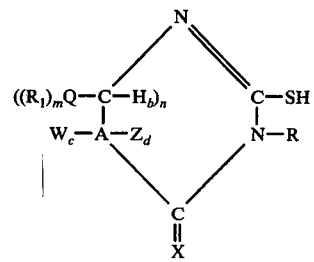

in which A is selected from the group consisting of nitrogen and carbon; Q is selected from the group consisting of a single bond; —O—, —S—, —SS—, —NH—, —NR$_2$ where R$_2$ can be alkyl having 1 to 18 carbon atoms, alkenyl having 3 to 6 carbon atoms, cycloalkyl, aryl, haloaryl, alkylaryl, and hydroxyaryl; —OYO—, —SYS—, and —NHYNH— where Y can be alkylene having 1 to 2 carbon atoms, arylene, and alkylarylene; R$_1$ is selected from the group consisting of hydrogen, alkyl having 1 to 18 carbon atoms, alkenyl having 3 to 6 carbon atoms, cycloalkyl, aryl, aralkyl, haloaryl, alkylaryl, alkyhydroxyaryl, N-morpholino and C-alkylmorpholino, N-piperidino and C-alkyl-N-piperidino, and 2,4-dimercapto-1,3,5-triazin-6-yl, provided that when R$_1$ is N-morpholino, C-alkylmorpholino, N-piperidino, and C-alkyl-N-piperidino Q is a single bond; W is selected from the group consisting of hydrogen, alkyl having 1 to 12 carbon atoms, and alkenyl having 3 to 6 carbon atoms; Z is selected from the group consisting of hydrogen, alkyl having 1 to about 12 carbon atoms, and alkenyl having 3 to 6 carbon atoms; $b$ is zero and $m$ is one and $c$, $d$, and $n$ are each independently zero or one, provided that when $n$ is one A is nitrogen, W is hydrogen, $c$ is one and $d$ is zero.

17. A halogen-containing resin composition having improved initial clarity and resistance to deterioration when heated at 350° F, comprising a halogen-containing resin and a stabilizing amount of a stabilizer composition in accordance with claim 1.

18. A resin composition in accordance with claim 17 in which the resin is polyvinyl fluoride.

19. A resin composition in accordance with claim 17 in which the resin is a vinyl chloride homopolymer.

20. A resin composition in accordance with claim 17 in which the resin is a copolymer of vinyl chloride with a comonomer selected from the group consisting of vinyl acetate, ethylene, propylene, 1-hexene, and vinyl n-dodecyl ether.

* * * * *